US007030974B2

(12) United States Patent
Spirin et al.

(10) Patent No.: US 7,030,974 B2
(45) Date of Patent: *Apr. 18, 2006

(54) ALARM CONDITION DISTRIBUTED FIBER OPTIC SENSOR WITH STORAGE TRANSMISSION-REFLECTION ANALYZER

(75) Inventors: Vasilii V. Spirin, Ensenada (MX); Mikhail G. Shlyagin, Ensenada (MX); Serguei V. Miridonov, Ensenada (MX); Francisco J. Mendieta Jimenez, Ensenada (MX); Alfredo Márquez Lucero, Ensenada (MX); Enrique Mitrani Abenchuchan, Ensenada (MX)

(73) Assignees: Centro de Investigacion Cientifica y de Educacion Superior de Ensenada, (MX); Centro de Investigaciones en Materiales Avanzados, S.C., (MX)

( * ) Notice: Subject to any disclaimer, the term of this patent is extended or adjusted under 35 U.S.C. 154(b) by 13 days.

This patent is subject to a terminal disclaimer.

(21) Appl. No.: 10/792,163

(22) Filed: Mar. 3, 2004

(65) Prior Publication Data

US 2004/0240769 A1 Dec. 2, 2004

Related U.S. Application Data

(60) Provisional application No. 60/451,534, filed on Mar. 3, 2003.

(51) Int. Cl.
*G01N 21/00* (2006.01)

(52) U.S. Cl. ........................................ 356/73.1

(58) Field of Classification Search ............... 356/73.1, 356/32–35; 250/227.11–227.19, 227.27, 250/227.28; 385/10–13, 37; 374/161; 73/800
See application file for complete search history.

(56) References Cited

U.S. PATENT DOCUMENTS 6,542,228 B1 * 4/2003 Hartog ...................... 356/73.1
6,678,211 B1 * 1/2004 Vakoc ........................ 367/149
6,694,067 B1 * 2/2004 O'Keefe et al. .............. 385/12
6,753,520 B1 * 6/2004 Spirin et al. ........... 250/227.16

* cited by examiner

*Primary Examiner*—Tu T. Nguyen
(74) *Attorney, Agent, or Firm*—Pendorf & Cutliff

(57) ABSTRACT

This invention pertains to alarm condition fiber optic sensor with storage transmission-reflection analyzer for detection and localization of any number of consecutive loss-inducing disturbances along the test fiber.

10 Claims, 6 Drawing Sheets

ALARM CONDITION DISTRIBUTED FIBER OPTIC SENSOR WITH STORAGE TRANSMISSION-REFLECTION ANALYZER

REFERENCE TO RELATED APPLICATIONS

This application is a non-provisional of Provisional Application No. 60/451,534 filed Mar. 03, 2003.

BACKGROUND OF THE INVENTION

1. Technical Field

The present invention relates to optical fiber sensors and, more specifically, to distributed fiber optical sensors where an external perturbation such as temperature, pressure, displacement, etc, introduces additional losses at different locations along the sensing fiber. Particularly, this invention relates to a distributed optical fiber sensor suitable to be used as an alarm-conditions detector in industrial, military and civilian systems.

2. Description of the Related Art

Distributed fiber optical sensors that can detect the loss-inducing perturbations are widely used in many different fields. For example, environmental sensors are used to detect pollutants and have become increasingly important as environmental standards. Chemical and petrochemical industry is another field where the use of sensors is growing, especially in the area of alarm-condition diagnostics. Further, sensors also used for temperature and strain measurements in various industrial applications.

The prior art includes many attempts to provide reliable detection of leaks of the contents of tanks, pipelines and the like. Detection of leaks in a simple, efficient and reliable fashion is highly desired at present because of increased public awareness of the sensitivity of the environment to chemical spills and the like. Moreover, increasing regulatory activity mandates reduction of industrial leakage of toxic chemicals and the like, and detection and cure of such leaks before their effects can become dangerous or catastrophic.

U.S. Pat. No. 5,378,889 to Lawrence entitled "Method and Apparatus for Detecting Hydrocarbon Fuels in a Vapor State with an Absorber-Expander Member" discloses a fiber optic sensor for the detection of hydrocarbon fuels. This type of prior art fiber optic sensor, however, is not optimal. The fiber optic sensor is inaccurate and limited in the distance over which it may be used.

U.S. Pat. No. 4,590,462 to Moorehead entitled "Oil leakage detection apparatus" employs microbending of an optical fiber in a detection unit to detect hydrocarbon fuels. A rotary actuator is mechanically coupled to an optical fiber to produce microbending of the fiber. The rotary actuator includes a spring mechanism having stored energy, which is released upon degradation of shear pins under the action of hydrocarbons. Thus, when the hydrocarbon analyte is present in sufficient quantity to degrade the shear pins, the spring is released and the optical fiber displaced to produce a microbend that can be sensed by optical time domain reflectometry. This approach, however, clearly is not reversible since it depends upon destruction of the shear pins upon contact with the hydrocarbon.

The prior art further shows a method for detecting the leak of an analyte by using a fiber optic sensor in conjunction with a substance that swells and mechanically creates a perturbation in, or particularly, a microbending in the optical fiber. The condition can then be readily detected by the attenuation in the signal transmitted by the fiber or by optical time domain reflectometer (OTDR).

For example, U.S. Pat. No. 5,138,153 to Gergely et al. entitled "Distributed Fiber-Optic Sensor with Substance Selective Permeable Coating" discloses a fiber optic sensor based upon passing effects in which the cladding has an index of refraction less than the core, and the cladding is sensitized to the analyte. When the analyte contacts the cladding, it increases the index of refraction of the cladding above the core to thereby couple the light transmitted in the core to the evanescent wave. The Gergely et al. patent employs its sensor system in a hydrocarbon tank farm, but the cladding is selected to undergo an increase in the index of refraction. Optical time domain reflectometry is used to locate leaks, and both continuous and pulsed light can be employed to sense liquids and vapors having analytes, which will react with the cladding. The Gergely reference detects the leak in the pipeline, but not the location of the leak.

U.S. Pat. No. 5,015,843 to Seitz et al. entitled "Fiber Optic Chemical Sensors Based on Polymer Swelling" is directed to a fiber optic system in which polymer swelling is used to mechanically or physically displace a reflective surface coupled to the fiber optic core and thereby influence light transmission back to the detector. The system requires a relatively high concentration of analyte to be effective, and in order to enhance sensitivity and minimize this disadvantage, the system preferably is miniaturized.

In some environments, it is necessary or desirable to monitor the location and magnitude of selected loads acting upon a physical structure.

U.S. Pat. No. 4,421,979 to Asawa et al., entitled "Microbending of Optical Fibers for Remote Force Measurement" discloses a system for remote measurement of structural forces, including a plurality of microbend transducers mounted along the length of the structure for microbending an optical fiber in response to structural forces.

All prior art distributed sensors use for the localization of number of consecutive perturbations time or frequency domain analysis. In general, prior art detectors have been unduly complicated, and thus, both expensive and prone to erroneous signals.

U.S. Pat. No. 6,542,228 to Hartog, entitled "Optical time domain reflectometry method and apparatus" discloses a system for the localization of number of the consecutive perturbations using optical time-domain reflectometry (OTDR)

U.S. Pat. No. 4,840,481 to Spillman, Jr, entitled "Polarimetric optical frequency domain distributed strain sensor and method" and U.S. Pat. No. 4,859,843 to Baney et al., entitled "Method and apparatus for optical signal analysis using a gated modulation source and an optical delay circuit to achieve a self-homodyne receiver" disclose a system which utilizes optical frequency domain reflectometry (OFDR) for the localization of the number of consecutive perturbations. The authors of these inventions do not teach how to localize the number of the perturbations using unmodulated light flux.

United States Patent Application 20030052256 to Spirin et al, entitled "Fiber optic sensor with transmission/reflection analyzer" discloses a fiber optical distributed sensor for the localization of the single perturbation using non-modulated light flux. However, the invention does not describe how to localize a number of the perturbations that can affect testing fiber consequently or simultaneously.

Accordingly, there is a need in the art for a system and device for detecting and localizing number of consecutive loss-inducing perturbations, which system and device are comparatively easy to manufacture, inexpensible, and reliable.

Accordingly, it is an object of the present invention to provide an alarm sensor and method for its use which is adaptable to a wide range of applications, is suitable for sensing a number of consecutive loss-inducing perturbations.

The present invention overcomes the problems encountered in the prior art by providing a practical and effective optical fiber sensor for detecting the magnitude and location of any number of consecutive perturbations acting along the length of a structure.

SUMMARY OF THE INVENTION

The devices described by this disclosure are intended to disclose, among others, distributed fiber optic sensors that may be used for alarm-condition sensing.

The applications to which alarm distributed fiber optic sensor may be applied are numerous. In the chemical and petrochemical industry, these include leak detection sensors for pipeline and tanks. As well, the present invention can be used for fire and explosion detection in any industrial, military and civilian systems Briefly described, the present invention comprises:

a test fiber placed along test object, a light source for producing a beam of light propagating along the test fiber;

a fiber optic beamsplitter having a first port connected to the light source, a second port connected to the first port of the test fiber, and a third and a fourth port;

a plurality of reflectors positioned along the test fiber and a plurality of loss-inducing members positioned along the test fiber, wherein said each of the reflectors is matched to each loss-inducing members, wherein at least one reflector is placed between each consecutive loss-inducing members;

an optical reflection detector to receive a light flux, the optical reflection detector connected to the third port of optic beamsplitter, wherein the reflection detector is adapted to sense changes in the average power of the light reflected from the reflectors;

an optical transmission detector adapted to receive the light flux, connected to the second port of test fiber, said transmission detector being operable to sense changes in the average power of the light transmitted through the test fiber; and a storage transmission-reflection analyzer connected to reflection and transmission detectors, and adapted to measure time-behavior of the transmission-reflection dependencies of test fiber, said analyzer being operable to identify the locations and values of any number of consecutive loss-inducing disturbances along the test fiber by using stored locations and values of previous perturbations and the slope of dependence of normalized reflected average power versus the square of normalized transmitted average power for current loss-inducing perturbation.

The foregoing has outlined rather broadly the features and technical advantages of the present invention in order that the detailed description of the invention that follows may be better understood. Additional features and advantages of the invention will be described hereinafter, which form the subject of the claims of the invention.

BRIEF DESCRIPTION OF THE DRAWINGS

For a fuller understanding of the nature and objects of the present invention, reference should be made by the following detailed description taken in with the accompanying drawings in which.

DETAILED DESCRIPTION OF THE SHOWN EMBODIMENTS

Reference will now be made in detail to the preferred embodiments of the invention, examples of which are illustrated in the accompanying drawings.

Figure 1:
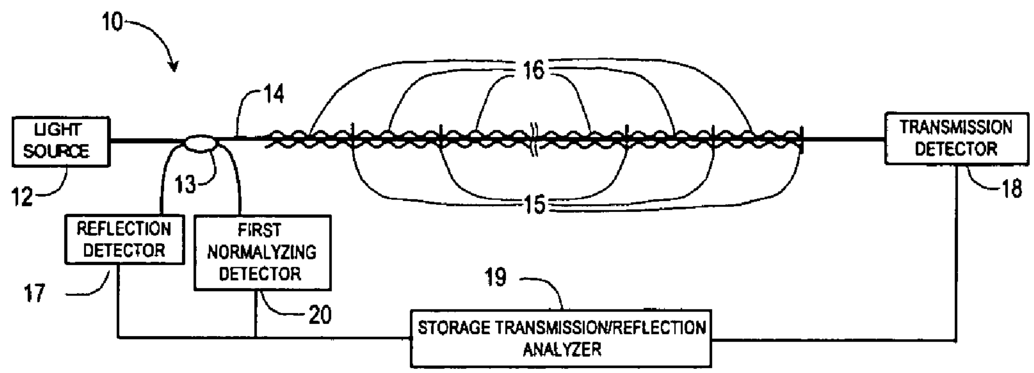
FIG. 1 is a schematic representation illustrating the basic embodiment of fiber optic distributed sensor with storage transmission-reflection analyzer constructed in accordance with the present invention.

Referring to FIG. 1, the present invention comprises a distributed fiber optic sensor with storage transmission-reflection analyzer 10. The embodiment includes a light source 12 that may for example be a LED, laser or white light source, a test fiber 14, an optical transmission detector 17, and reflection detectors 18, which may, for example, be a photodiode. The light source 12 is operable to generate a light flux, which is launched into the test fiber 14 through the coupler 13.

The present invention can use standard telecommunication single or multimode silica or plastic fiber or any special light waveguide as said test fiber. The sensor is positioned along the structure to be monitored. The sensor 10 includes a plurality of loss-inducing members 16 characterized by a sensitivity to temperature, displacement, pressure or other measurands.

The light propagated along test fiber is partially reflected back by plurality of reflectors 15 positioned along the test fiber and partially scattered out due to the pass through of a plurality of loss-inducing members 16 positioned along the test fiber.

The reflection detector 17 is operable to sense change in the average power of the reflected light, and the transmission detector 18 is operable to sense change in the average power of the transmitted through test fiber light. Both transmission and reflection detectors electrically connected to storage transmission-reflection analyzer 19 which is operable identify the locations and values of any number of consecutive disturbances along the test fiber by using a stored locations and values of all previous perturbations and relation between transmitted and reflected average powers for current loss-inducing perturbation.

In order to enhance sensitivity, the measurement of the reflected and transmission light is preferably accomplished by normalizing the power of measured light on input laser power. The normalizing optical detector 20 is being operable to sense changes in the average power of light source in order to avoid the influence of light source power instability.

With the current invention, the first one perturbation can be detected and localized by using the unique relationships between normalized transmitted and reflected or Rayleigh backscattered powers of a non-modulated CW light source for different locations of the loss-induced disturbance along the sensing fiber. If, for example, the losses occur at the remote-end of the sensing fiber, an increase in the loss leads to a proportional decrease of the average transmitted power. However, it does not change the average reflected (or Rayleigh backscattered) power, because all fiber length participates in reflection (or backscattering) and the launched power is the same such as for undisturbed fiber. However, if we induce the losses close to the source-end, the decrease in transmitted power is accompanied by a decrease in the reflected (or Rayleigh backscattered) power. Because in this case the launched into the fiber power is decreased, and reflected power is also decreased due to the induced losses. Further, if we induce the losses in the middle, the first half of the fiber, which is closer to the source-end reflects or scatters the light as well as half of undisturbed fiber, but the power reflected or scattered from the second half is less due to losses induced in the middle. So, in general, for the identical loss-induced perturbations, the value of the decrease in normalized reflected or backscattered power depends on the location of the excess loss region.

However, a number of consecutive disturbances, which induce the losses along the test fiber 14 can be localized using a storage transmission-reflection analyzer 19 only. Said analyzer 19 founds the locations and values of any number of consecutive disturbances by using a special algorithm, which take into account the stored locations and values of all previously terminated perturbations and time-behavior of the relation between transmitted and reflected powers for currently acting perturbation or perturbations.

Figure 2:
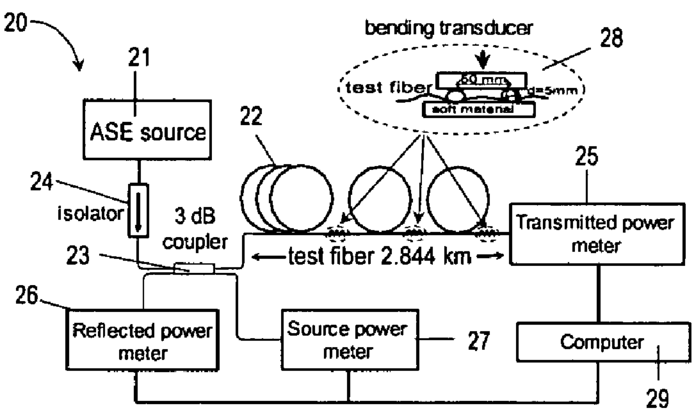
FIG. 2 is a schematic representation of an experimental embodiment of the current invention utilizing Rayleigh scattering in standard communication fiber and bending loss-inducing transducers.

An experimental embodiment of the current invention 20 utilizing Rayleigh scattering in standard communication fiber and bending loss-inducing transducers is shown in FIG. 2. CW light emitted by a amplified spontaneous emission (ASE) optical fiber source 21 operating near 1550 nm wavelength with a line width of few nm was launched into a 2.844 km-long standard single mode step-index fiber 22 through 3 dB coupler 23. The launched optical power was about 1.1 mW, and the attenuation coefficient of the test fiber, $\alpha$, which was measured with optical time-domain reflectometer (OTDR) was equal to 0.19 dB/km. The optical isolator 24 was used to cancel back reflections influence on ASE source. An immersion of all fiber ends was employed in order to reduce back reflections. Standard power detectors 25, 26, were used to measure the average transmitted and Rayleigh backscattered powers. In order to take into account the output laser power fluctuations, a source power meter 27 was utilized.

All power meters are electrically connected with computer 29, which store and process experimental data. To induce the bending losses in the sensing fiber 22, we used bending transducers 28, which are also shown schematically in FIG. 2. By tuning the bending transducer 28, we changed the normalized transmitted power from its initial undisturbed value equal to 1 up to more than −30 dB. The bending losses were induced near source-end and near remote-end of the test fiber.

Figure 3:
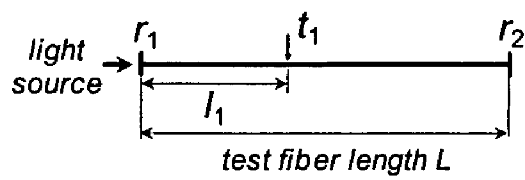
FIG. 3 shows the test fiber configuration for single perturbation; $t_1$—transmission of loss-inducing segment, $r_1$, $r_2$—reflections from source- and remote-ends.

In the current invention, the modified transmission-reflection analysis (TRA) algorithm was used for localization of single and multi-point perturbations. As was shown in Vasili V. Spirin, "Transmission/reflection analysis for localization of temporally successive multi-point perturbations in distributed fiber-optic loss sensor based on Rayleigh backscattering", Applied Optics-OT, v. 42, N7, pp. 1175–1181, 2003 the slope of dependence of normalized backscattering power $R_{norm}$ versus the square of normalized transmitted power $T^2_{norm}$ uniquely depends on single perturbation location $l_1$ (see FIG. 3).

$$\frac{\partial R_{norm}}{\partial (T^2_{norm})} = \frac{S_\alpha(e^{-2\alpha l_1} - e^{-2\alpha L}) + r_2 e^{-2\alpha L}}{S_\alpha + r_1 - (S_\alpha - r_2)e^{-2\alpha L}}. \quad (1)$$

where L is the total sensing fiber length, $l_1$ is the distance from source-end to disturbance location, and $S_\alpha = S(\alpha_S/2\alpha)$, $\alpha_S$ is the attenuation coefficient due to Rayleigh scattering, $\alpha$ is the total attenuation coefficient of the test fiber, $r_1$ and $r_2$ are the reflection coefficients from the fiber source- and remote-ends, respectively.

Therefore, with the current invention, the location of the single perturbation can be found from experimentally measured slope of dependence of normalized backscattering power versus the square of normalized transmitted power.

Figure 4:
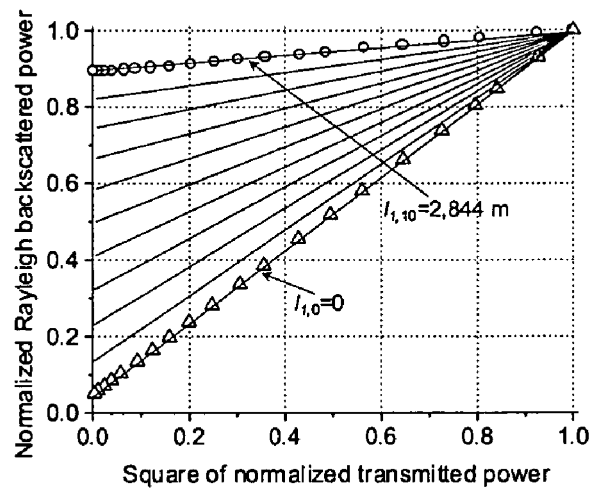
FIG. 4 shows relations between normalized Rayleigh backscattered power and the square of normalized transmitted power when additional losses occur at distances $1_{1,n}$=nΔL from the source-end of the test fiber, where n=0,1 . . . 10, and the interval between bending locations ΔL=284.4 m. (○, Δ-experimental results, solid lines—theoretical dependencies).

The relationship between normalized Rayleigh backscattered power $R_{norm}$ and the square of normalized transmitted power $T^2_{norm}$ is linear for any single perturbation which affects the test fiber in any location. FIG. 4 shows the result of the numerical calculation of these relationships when additional losses occur at distances $l_{1,n}=n\Delta L$ from the source-end of the test fiber 22, where n=0,1 . . . 10, and the interval between bending locations $\Delta L$=284.4 m. Transmitted and backscattered average powers were normalized with respect to their initial undisturbed values. A typical parameter for standard communication single-mode fiber was used in the calculations.

FIG. 4 also shows the experimental dependencies between normalized Rayleigh backscattered power and square of normalized transmitted power for the losses induced near the source end of the test fiber $l_{1,0}=0$, and near the remote end of the test fiber $l_{1,10}$=2,844 km. Reflections from the source-end and the remote-end of the sensing fiber 22, which are respectively equal to $4.7\times10^{-6}$ and $1.5\times10^{-5}$ in our experiment, were also taken into account in the calculations.

Figure 5:
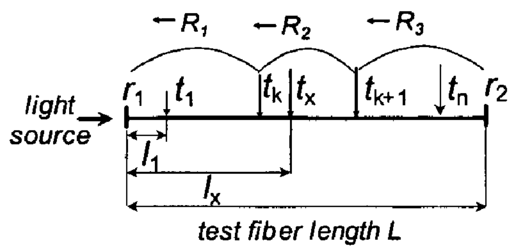
FIG. 5 shows test fiber configuration for multi-point perturbations; $t_1 \div t_n$—transmission of initially disturbed loss-inducing segments, $t_X$ transmission of currently disturbed segment, $r_1$, $r_2$—reflections from source- and remote-ends.

Using a storage transmission-reflection analyzer 19 any number of consecutive perturbations can be localized with modified TRA method. As it was shown in Vasili V. Spirin, "Transmission/reflection analysis for localization of temporally $$l_x = \frac{1}{2\alpha}\ln\left\{\frac{S_\alpha}{\left(\left[\frac{\partial R_{norm}}{\partial(T^2_{norm})} - F(k^*+1,n)\right]R_{\max}\prod_{j=k+1}^{n} t_j^2 + S_a e^{-2\alpha l_{k^*+1}}\right)}\right\} \tag{2}$$

successive multi-point perturbations in distributed fiber-optic loss sensor based on Rayleigh backscattering", Applied Optics-OT, v. 42, N7, pp. 1175–1181, 2003 the location of unknown perturbation $l_x$ can be found as:

where $l_j$ and $t_j$ are the location and transmission of initial loss-inducing short segments (see FIG. 5), F(k,n) is a helper function, and $R_{max}$ is the maximum back-scattering coefficients of undisturbed optical system.

Figure 6:
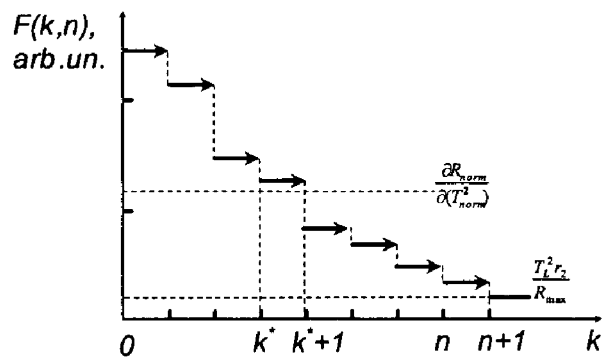
FIG. 6 shows the principle of preliminary localization of (n+1)-th perturbation with helper function F(k,n).

In this calculation, we assumed that the unknown perturbation is located between k*-th and (k*+1)-th initial perturbations (see FIG. 6) and found the value of the help function F(k*+1,n) using experimentally measured slope for current perturbation.

Therefore, we have presented the algorithm for a storage transmission-reflection analyzer 19 which can be used for the localization of any number of consecutive perturbations.

Figure 7:
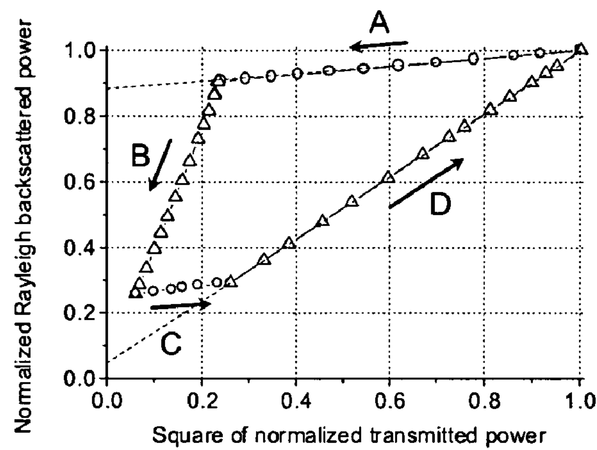
FIG. 7 shows relations between normalized Rayleigh backscattered power and the square of normalized transmitted power for the bending losses consequently induced near the remote- and source-ends of test fiber.

FIG. 7 shows experimental dependencies of normalized Rayleigh backscattered powers versus the square of normalized transmitted powers for the bending losses consequently induced near the remote- and source-ends of test fiber using bending transducers 28. Measurements were performed as follows. Initially, the perturbation occurred near the remote-end of test fiber 22. The increase of the losses leads to decrease of transmitted power (line A in FIG. 7). When the square of normalized transmittance decreases to the value equal to 0.241 of its initial undisturbed magnitude, we stop to increase the bending losses. Afterwards, keeping constant losses near the remote-end, we induce additional losses near the source-end of test fiber 22. This loading continues until the value of the square of normalized transmittance decreases to the 0.061 (line B in FIG. 7). Then, keeping the same value of losses near the source-end, we gradually remove the losses near the remote-end of test fiber 22 (line C in FIG. 7.). Finally, by eliminating the losses near the source-end, all parameters return to their initial undisturbed values (line D).

All experimental dependencies presented in FIG. 7 possess linear behavior. Experimental data show good agreement with theoretical prediction. Experimentally measured slopes for lines A, B, C and D which are equal to 0.109, 3.63, 0.109 and 0.955, correspondingly, agree with the calculated values which are equal to 0.108, 3.631, 0.108 and 0.957, correspondingly. Note that the slopes were the same for loading and unloading dependencies. The localization errors that were estimated from the difference between measured and calculated slopes do not exceed 2 meters for any location of perturbation.

The current invention is preferably oriented on the localization of rare alarm-like perturbations, which occur usually as infrequent events, and which appear consecutively one after another at different positions along the test fiber 22.

Figure 8:
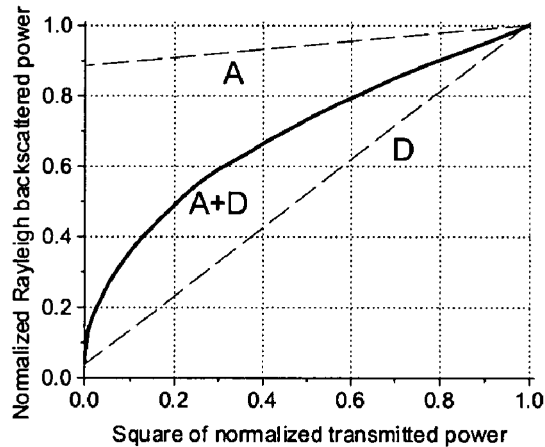
FIG. 8 is a schematic representation of an experimental embodiment of the current invention with optical circulator and linear chirped Bragg grating.

Meanwhile, current invention with a storage transmission-reflection analyzer 19 can be implemented for the localization of the perturbations that affect the test fiber 22 simultaneously. FIG. 8 shows the dependence of normalized Rayleigh backscattered power versus the square of normalized transmitted power for two equal perturbations which induce the losses near the source- and remote-ends at same time (curve A+D in FIG. 8). The dependence exhibits clear nonlinear behavior. As was shown above for any number of consecutive perturbations this dependence should be linear. FIG. 8 also shows normalized Rayleigh backscattered power versus the square of normalized transmitted power for the perturbations that affect the testing fiber one after another near the remote (line A) and source (line D) ends. Both last dependencies exhibit clear linear behavior.

The nonlinear behavior of dependencies of normalized Rayleigh backscattered power versus the square of normalized transmitted power indicates that testing fiber is affected by two or more perturbations simultaneously. Using the particular root dependence that is shown in FIG. 8 (curve A+D), it is possible to conclude that two perturbations affect the test fiber simultaneously near the source-end and near the remote-end.

Additionally, the value of normalized Rayleigh backscattered power at the point when normalized transmitted power is equal to 0 directly shows the location of nearest to the source-end perturbation.

Figure 9:
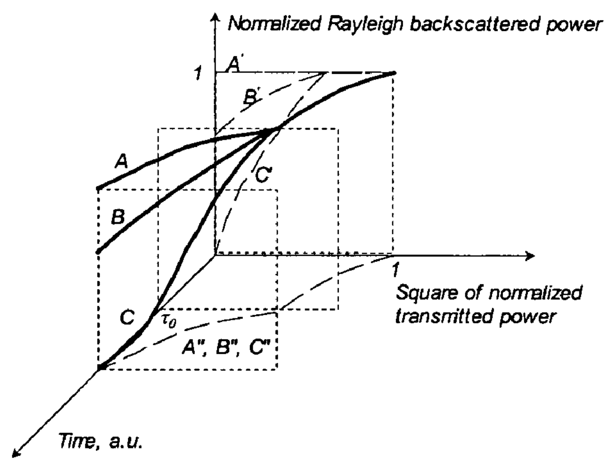
FIG. 9 shows relations between normalized Rayleigh backscattered power and the square of normalized transmitted power for two perturbations synchronously (A+D) and independently (A and D) induced near the remote- and source-ends of test fiber.

However it is an incredible situation when two rare alarm-like disturbances start to affect the test fiber 22 exactly at the same time, but at different locations. FIG. 9 shows the time-dependencies of normalized Rayleigh backscattered power and square of normalized transmitted power, which was obtained using a storage transmission-reflection analyzer 19. Two perturbations affect the test fiber 22 simultaneously, but they start to act at different times. The first perturbation to start affects the test fiber near the remote-end, firstly. Then, after a time interval $\tau_0$, the second one starts to affect the test fiber simultaneously with the first one. The time-dependencies for the different locations of the second perturbation (lines A,B,C) are used for the localization of the second perturbation. Therefore, the embodiment with a storage transmission-reflection analyzer 19 allows localize the perturbations, which affect the test fiber simultaneously at different positions along the test fiber 22.

Figure 10:
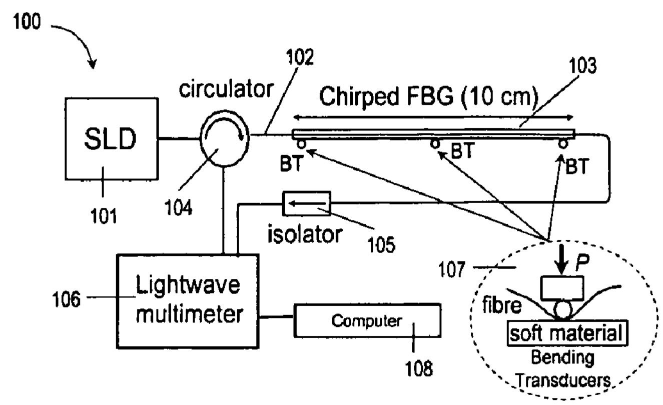
FIG. 10 shows the dependencies of normalized Rayleigh backscattered power versus time and square of normalized transmitted power for the different locations of the second perturbation (lines A,B,C). A',B',C' and A",B",C" are the plane projections on plane "Normalized Rayleigh backscattered power—Square of normalized transmitted power" and "Square of normalized transmitted power—Time", correspondingly.

An other experimental embodiment of the current invention with optical circulator and linear chirped Bragg grating.100 is shown in FIG. 10 (see also V. V. Spirin at al, "Distributed fibre-optic loss sensor with chirped Bragg grating based on transmission-reflection analysis", Electronics Letters, v. 39, N12, pp. 895–897, 2003.). Continuous-wave light emitted by a super-luminescent diode 101 operating near 1550 nm wavelength with a line width of about 30 nm was launched into a single-mode fibre 102 with chirped Bragg grating 103 through an optical circulator 104. The launched optical power was about 0.33 mW.

The optical isolator 105 was used to cancel back reflection from output end of test fibre. Standard two-channel lightwave multimeter 106 was used to measure the average transmitted and Rayleigh backscattered powers. Multimeter is electrically connected with computer 108, which store and process experimental data.

To induce the bending losses in the sensing fibre, we used bending transducers 107, which are also shown schematically in FIG. 10. The losses were induced by bending approximately 1–2 mm of chirped grating at different positions. By tuning the bending transducer 107, we changed the normalized transmitted power from its initial undisturbed value up to more than −30 dB.

Reflections from the source-end and the remote-end of the sensing fibre were respectively equal to $1.5\times10^{-5}$ and $2.0\times10^{-5}$ in our experiment.

The linearly chirped Bragg grating 103 were written in the core of the photosensitive single-mode fibre by using a 10-cm length phase mask and a pulsed excimer laser operating at a wavelength of 248 nm. The period of the linearly chirped Bragg grating 103 linearly varies with the length of the grating.

As a result, the different parts of the gratings efficiently reflect different bands of wavelengths, and the total reflected power depends on loss region location. If the bending losses occur at the remote-end of the grating (see FIG. 10), an increase in the loss leads to a proportional decrease of the transmitted power. However, it does not change the total reflected power. In contrast, if we bend the fibre with grating close to the source-end, the decrease of the transmitted power is accompanied by a decrease of the reflected power. In general, for the identical loss-induced perturbations, the value of the decrease in normalized reflected power depends on the location of the excess loss region. Therefore, the localization of loss region can be performed by measurement of transmitted and reflected powers using lightwave multimeter 106 and computer 108.

Figure 11:
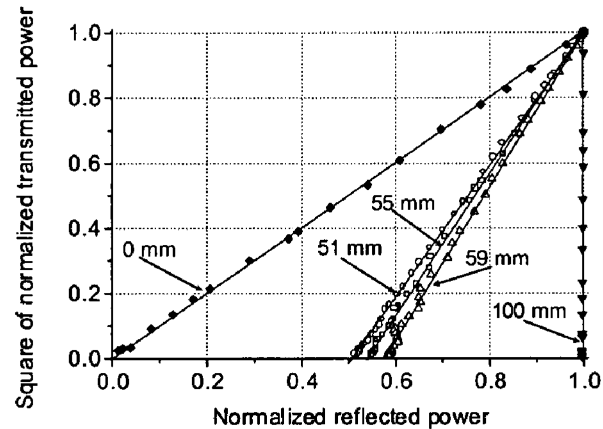
FIG. 11 shows relations between normalized reflected and square of normalized transmitted powers for losses induced at different positions along the grating.

FIG. 11 presents the relations between normalized reflected power and square of normalized transmitted power for the excess losses induced at different positions along the grating 103. The relationships are approximately linear for a perturbation, which may affect the test fibre 103 at any location. The slopes of the lines representing the relationships uniquely depend on the position of the perturbation along the test fibre 103. Hence, the localization of the perturbation with the current invention can be performed by evaluation of the slope of the line representing the dependence of normalized reflected power versus the square of normalized transmitted power for the sensor with linearly chirped Bragg grating 103.

The accuracy of localization of excess loss with current invention strongly depends on the value of the induced loss. With the current invention, it is easier to localize strong perturbation, but the localization of weak perturbation requires higher measurement accuracy for the transmitted and Rayleigh backscattered powers.

Figure 12:
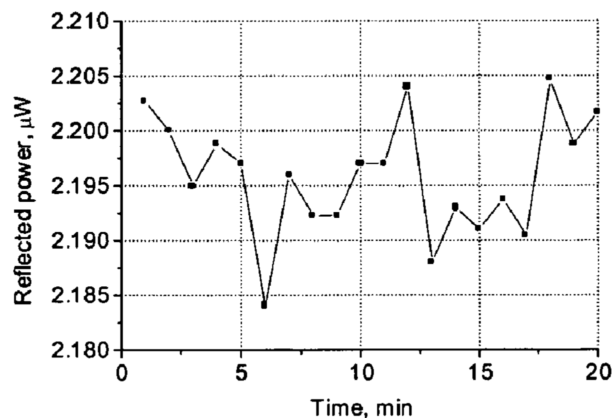
FIG. 12 shows variation of normalized reflected power for the strong losses induced near the remote-end of the fibre.

In contrast to this, the accuracy of localization of loss with the standard OTDR mainly depends on the duration of the optical test pulse and is practically independent on the value of loss. We estimated the localization error of the TRA method from the variations of reflected power for the strong bending losses that decrease the fibre transmission by more than 30 dB. FIG. 12 shows the variations of normalized reflected power for the strong losses induced near the remote-end of the test fibre 103 during 20 minutes. The maximum deviation of normalized reflected power was approximately equal to $\pm6\times10^{-4}$ that potentially provides the maximum localization error equal to ±0.5 mm for strong perturbation at any location along the 10 cm-length test fibre with grating 103.

Actually, however, the accuracy of the localization was worse. In the experiment, by bending the optical fibre at a specified location, we also irregularly bend other parts of grating that leads to additional losses. This results in an extra localization error. Another reason for the increased localization error is related with an imperfection of the grating.

However, this error can be efficiently compensated by means of appropriate calibration procedure. FIG. 11 shows the relations between normalized reflected and square of normalized transmitted powers for the losses induced at three locations separated by 4 mm. Different locations of the perturbation separated by 4 mm can be clearly recognized for the losses that decrease initial transmission by 15% only. The maximum localization error estimated from the data presented in FIG. 11 is equal to ±2 mm. Note, that the length of the grating 103 can be increased without loss of localization accuracy at least at few times.

Figure 13:
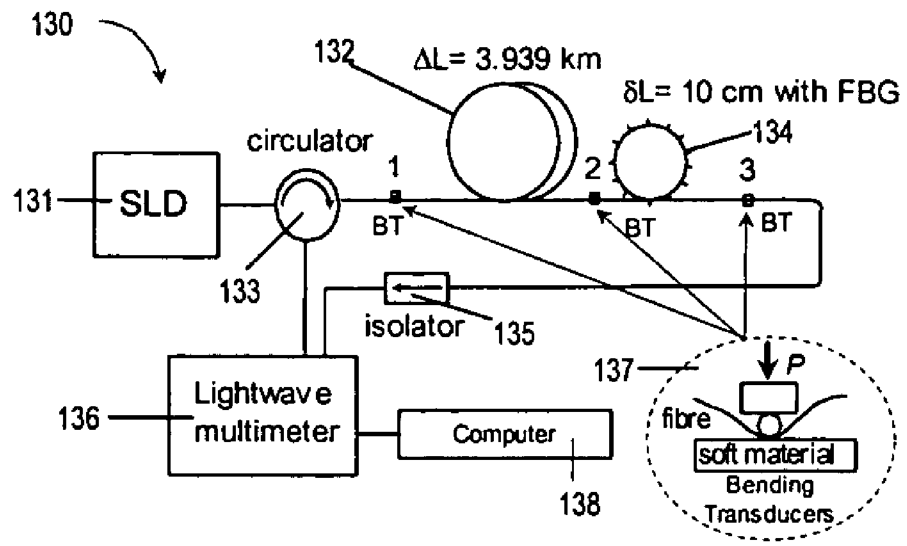
FIG. 13 is a schematic representation of an experimental embodiment of the current invention with variable localization accuracy along the test fiber.

Other experimental embodiment of the current invention with variable localization accuracy along the test fiber 130 is shown in FIG. 13. Continuous-wave light emitted by a super-luminescent diode 131 operating near 1550 nm wavelength with a line width of about 30 nm was launched into a 3.939 km-long standard single-mode step-index fiber 132 through an optical circulator 133. In order to provide higher localization accuracy along designated 10-cm length of test fiber 134, we have imprinted 20 Bragg gratings.

The Bragg gratings were written in the core of the standard communication single-mode fiber by using a phase mask technique and a pulsed excimer laser operating at a wavelength of 248 nm. The gratings had equal lengths of 0.5 mm each, and equally distributed along 10-cm length. The launched optical power was about 0.33 mW, and the attenuation coefficient of the test fiber, $\alpha$, which was measured with OTDR was equal to 0.21 dB/km.

The optical isolator 135 was used to cancel back reflection from output end of the test fiber. Standard lightwave multimeter 136 was used to measure the transmitted and reflected powers. Multimeter is electrically connected with computer 138, which store and process experimental data. To induce the bending losses in the sensing fiber, we used bending transducers 137, which are also shown schematically in FIG. 13.

By bending approximately 1–2 mm length of test fiber, we changed the normalized transmitted power from its initial undisturbed value equal to 1 down to below −30 dB. Reflections from the source-end and the remote-end of the sensing fiber were respectively equal to $1.4\times10^{-5}$ and $1.6\times10^{-5}$ in the experiment.

In this embodiment, the distributed fibre-optical sensor 130 has two segments with different differential reflectivity. In the first part 132 with the length $\Delta L$=3.939 km, the Rayleigh backscattering phenomena was used. The second part 134 with the length $\delta L$=10 cm, has a number of imprinted Bragg gratings (see FIG. 13). Note, that Rayleigh backscattered power coefficient $R_{\Delta L}$ is independent from the coherent properties of the incident light.

Figure 14:
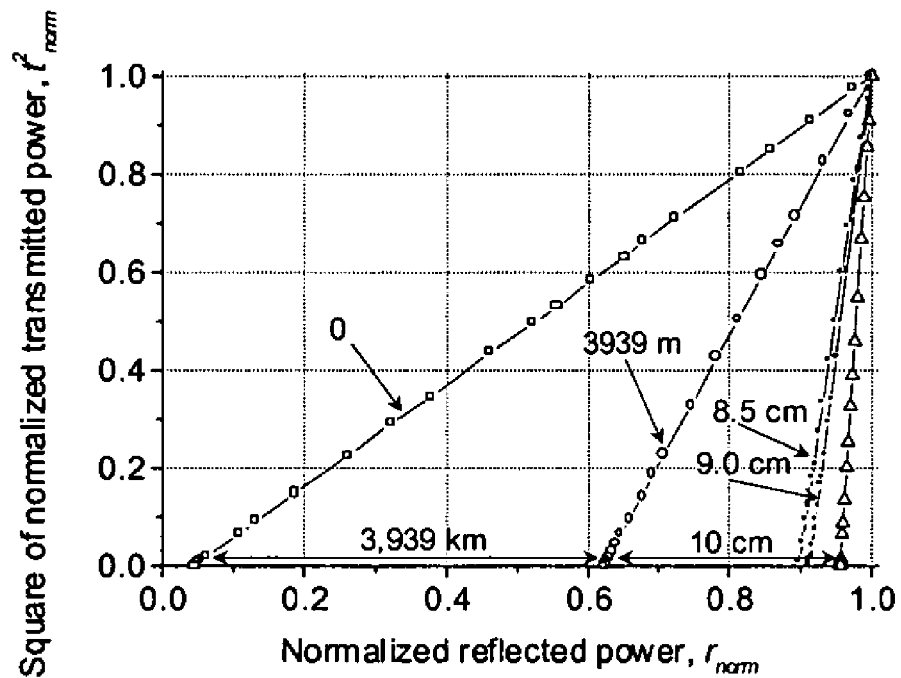
FIG. 14 shows relations between normalized reflected and square of normalized transmitted powers for losses induced close to the input (□), close to the end of 3,939 km fiber (○), and close to the remote-end of designated 10 cm-long part (Δ), of the sensing fiber respectively (positions 1, 2 and 3 in FIG. 11).
Figure 15:
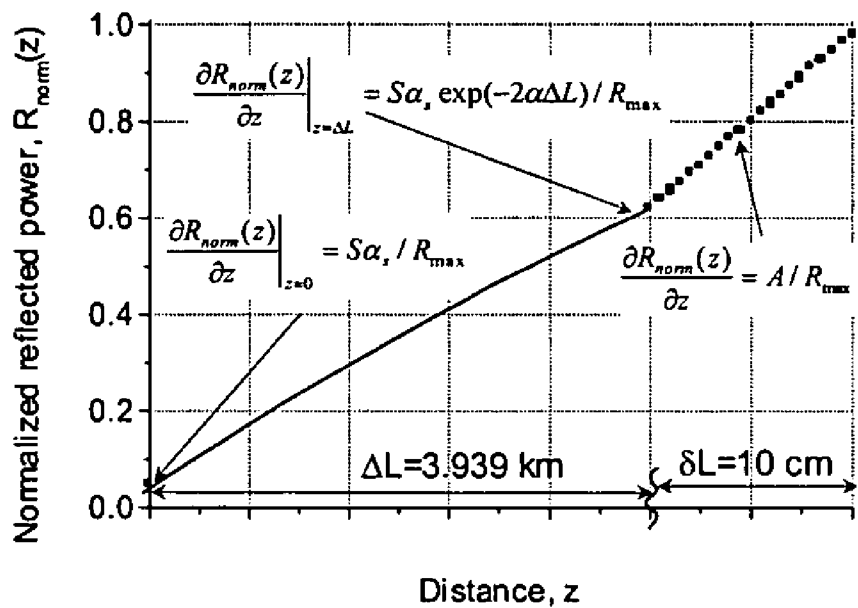
FIG. 15 shows normalized reflected power $R_{norm}(z)$ versus distance along the test fiber.

The relations between normalized reflected power $r_{norm}$ and square of normalized transmitted power $t^2_{norm}$ for the excess losses induced at different positions along the test fiber is presented in FIG. 14. All dependencies show linear behavior and the experimental data practically coincide with the theoretical prediction. FIG. 15 shows the dependence of normalized reflected power versus the distance $R_{norm}(z)$. This dependence can be interpreted as dependence of normalized reflected power versus the distance z where the strong loss ($t_{norm} \cong 0$) is induced. The dependence was calculated for the first part of the sensor and experimentally measured for the second one.

As was shown in V. V. Spirin, F. J. Mendieta, S. V. Miridonov, M. G. Shlyagin, Anatoli A. Chtcherbakov and Pieter L. Swart, "Localization of a loss-inducing perturbation with variable accuracy along a test fiber using transmission-reflection analysis, IEEE Photonic Techn. Lett., February 2004, the disclosure of which is incorporated herein by reference, for independently measured normalized reflected and transmitted powers, the standard deviation of disturbance location $\sigma l_1$ can be estimated as:

$$\sigma_l = \frac{1}{(1-t^2_{norm})\left.\frac{\partial R_{norm}(z)}{\partial z}\right|_{z=l}} \sqrt{\sigma^2_{r_{norm}} + \left(\frac{2t_{norm}[r_{norm}(l)-1]}{1-t^2_{norm}}\right)^2 \sigma^2_{t_{norm}}}, \quad (3)$$

where $\sigma r_{norm}$ and $\sigma t_{norm}$ are experimentally measured standard deviations of normalized reflected and transmitted powers, respectively.

Figure 16:
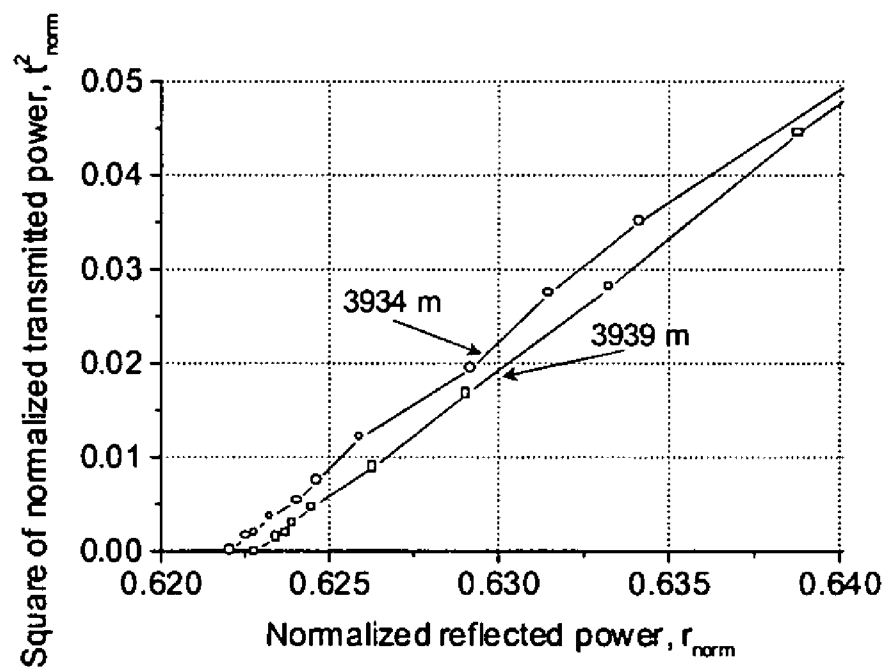
FIG. 16 shows relations between normalized reflected and square of normalized transmitted powers for losses induced at two locations separated by 5 meters.

In this embodiment, the differencial reflectivity which is equal to derivative $\partial R_{norm}(z)/\partial z$ depends on the location. In the fist 3.939 km-length segment of standard communication fiber 132 the value of the differencial reflectivity slightlly differ at the source- and remote-ends of the fiber segment due to the losses (see FIG. 15). Corresponding derivatives presented in FIG. 15 were calculated. The standard deviation of normalized Rayleigh backscattered power for strong perturbations ($t_{norm} \cong 0$) was equal to $2.4\times10^{-4}$ that provides the standard deviation of localization of strong perturbation approximately equal to 1.0 m at any position along the first 3.939 km-length segment of the test fiber 132. FIG. 16 shows the relations between the normalized transmitted and the square of normalized reflected powers for losses induced near the end of the first segment 132, at two locations separated by 5 meters.

Two different locations can be clearly recognized for the losses that decrease initial transmission by more than 5 times. Note that the accuracy of localization of excess loss with the current invention strongly depends on the value of the induced loss. With the current invention, it is easier to localize strong perturbation, but the localization of weak perturbation requires higher accuracy of the transmitted and Rayleigh backscattered powers measurements.

The second part of the sensor 134 in this embodiment has a significantly bigger value of the differencial reflectivity or derivative $\partial R_{norm}(z)/\partial z$, and as it fellows from Eqn (3), significantly higher localization accuracy.

In order to provide equal localization accuracy along second 10-cm length segment of the test fiber, the total normalized reflected back power $R_{norm}(z)$ must linearly increase with the distance along a designated length. To provide linearity, the reflectivity of the gratings must certainly change with the distance. By varying the number of excimer laser imprinting pulses for the different gratings, we can easily provide the linearity of the total reflected power versus the number of consequently imprinted gratings.

FIG. 14 shows the relations between normalized reflected and square of normalized transmitted powers for the losses induced at two locations separated by 5.0 mm. Two different locations of the perturbation can be clearly recognized for the losses that decrease initial transmission by 5% only.

What is claimed is:

1. A distributed fiber optic sensor comprising:

a test fiber having a first port and a second port;

a light source for producing a beam of light propagating along the test fiber;

a fiber optic beamsplitter having a first port connected to the light source, a second port connected to the first port of the test fiber, and a third and a fourth port;

a plurality of reflectors with distance-depending differential reflectivity positioned along the test fiber and a plurality of loss-inducing members positioned along the test fiber, wherein said each of the reflectors is matched to each loss-inducing members, wherein at least one reflector is placed between each consecutive loss-inducing members;

an optical reflection detector for detecting a light flux, the optical reflection detector connected to the third port of optic beamsplitter, wherein the reflection detector is adapted to sense changes in the average power of the light reflected from the reflectors;

an optical transmission detector adapted to receive the light flux, connected to the second port of test fiber, said transmission detector being operable to sense changes in the average power of the light transmitted through the test fiber; and a storage transmission-reflection analyzer connected to reflection and transmission detectors and adapted to measure time-behavior of a transmission-reflection dependencies of test fiber, said analyzer being operable to identify locations and values of any number of consecutive loss-inducing disturbances along the test fiber by using a stored locations and values of previous perturbations and the slope of dependence of normalized reflected average power versus the square of normalized transmitted average power for current loss-inducing perturbation.

2. The fiber optic sensor according to claim 1, wherein, said plurality of reflectors comprises a plurality of Rayleigh scattering centers uniformly distributed along the test fiber.

3. The fiber optic sensor according to claim 1, wherein said plurality of reflectors has increasing with the distance differential reflectivity that provides equal localization accuracy along the test fiber.

4. The fiber optic sensor according to claim 1, wherein said plurality of reflectors has different differential reflectivity at different locations that provides variable localization accuracy along the test fiber.

5. The fiber optic sensor according to claim 1, wherein said test fiber comprises single or multimode plastic fiber.

6. The fiber optic sensor according to claim 1, wherein said plurality of reflectors comprises a single chirped or non-chirped, reflective or long-period Bragg grating.

7. The fiber optic sensor according to claim 1, wherein said beamsplitter comprises an optical circulator.

8. The fiber optic sensor according to claim 1, wherein said transmission-reflection analyzer for the localization of the first disturbance operates under the following algorithm:

$$X=T^2(N-k+1)/N$$

where X is a power of a reflected light decrease

N is a number of lumped reflectors,

T is a decrease in percent of the transmitted power

K is an integer, which is defined by the position or number of the loss-inducing member that is disturbed.

9. The fiber optic sensor according to claim 1, wherein said storage transmission-reflection analyzer being operable to identify the location and value of perturbations that affect the test fiber simultaneously by using a stored locations and values of terminated perturbations and time-dependencies of average transmitted and reflected powers for currently acting disturbances.

10. A method for calculating the value and location of a disturbance in a system, the method comprising the steps of:

positioning an optical fiber sensor along the system to be monitored;

wherein the optical fiber sensor comprises:

a test fiber having a first port and a second port;

a light source for producing a beam of light propagating along the test fiber;

a fiber optic beamsplitter having a first port connected to the light source, a second port connected to the first port of the test fiber, and a third and a fourth port;

a plurality of reflectors positioned along the test fiber and a plurality of loss-inducing members positioned along the test fiber, wherein each of the reflectors is matched to each of the loss-inducing members, wherein at least one reflector is placed between each consecutive loss-inducing members;

an optical reflection detector for detecting a light flux, the optical reflection detector connected to the third port of optic beamsplitter, wherein the reflection detector is adapted to sense changes in the power of the light reflected from the reflectors;

an optical transmission detector adapted to receive the light flux, connected to the second port of test fiber, said transmission detector being operable to sense changes in the average power of the light transmitted through the test fiber; and a transmission-reflection analyzer connected to reflection and transmission detectors, said analyzer adapted to measure and store transmission-reflection dependencies of test fiber, said analyzer being operable to identify the locations and values of any number of consecutive loss-inducing disturbances along the test fiber by using a stored locations and values of previous perturbations and the slope of dependence of normalized reflected average power versus the square of normalized transmitted average power for current loss-inducing perturbation.

measuring and storing transmission-reflection dependencies of test fiber; and identifying the locations and values of any number of consecutive loss-inducing disturbances along the test fiber by using a stored locations and values of previous perturbations and the slope of dependence of normalized reflected average power versus the square of normalized transmitted average power for current loss-inducing perturbation.

* * * * *